(12) United States Patent
Vasconcelos et al.

(10) Patent No.: US 12,724,290 B2
(45) Date of Patent: Sep. 1, 2026

(54) STEREOSCOPIC DISPLAY DEVICE

(71) Applicant: VitreaLab GmbH, Vienna (AT)

(72) Inventors: Rui Vasconcelos, Vienna (AT); Jonas Zeuner, Vienna (AT); Chiara Greganti, Vienna (AT)

(73) Assignee: VITREALAB GMBH, Vienna (AT)

( * ) Notice: Subject to any disclaimer, the term of this patent is extended or adjusted under 35 U.S.C. 154(b) by 254 days.

(21) Appl. No.: 18/555,562

(22) PCT Filed: Jul. 22, 2022

(86) PCT No.: PCT/EP2022/070583
§ 371 (c)(1),
(2) Date: Oct. 16, 2023

(87) PCT Pub. No.: WO2023/002003
PCT Pub. Date: Jan. 26, 2023

(65) Prior Publication Data

US 2025/0123495 A1 Apr. 17, 2025

(30) Foreign Application Priority Data

Jul. 23, 2021 (EP) .................................... 21187482

(51) Int. Cl.
*G02B 30/27* (2020.01)
*G02B 30/26* (2020.01)
*H04N 13/305* (2018.01)

(52) U.S. Cl.
CPC ............. *G02B 30/27* (2020.01); *G02B 30/26* (2020.01); *H04N 13/305* (2018.05)

(58) Field of Classification Search
CPC .. G02B 30/26; G02B 30/27; G02B 30/33–36; H04N 13/305
See application file for complete search history.

(56) References Cited

U.S. PATENT DOCUMENTS 10,298,921 B1 5/2019 Frayne et al.
2013/0077154 A1 3/2013 Popovich et al.
2018/0143449 A1* 5/2018 Popovich ........... G03B 21/2033
(Continued)

FOREIGN PATENT DOCUMENTS

EP 2 521 368 A2 11/2012
EP 3 832 201 A1 6/2021
(Continued)

OTHER PUBLICATIONS

International Search Report and Written Opinion issued in corresponding application, PCT/EP2022/070583; mailing date Oct. 17, 2022.

(Continued)

*Primary Examiner* — Jessica M Merlin
(74) *Attorney, Agent, or Firm* — Chrisman Gallo Tochtrop LLC

(57) ABSTRACT

A display device including: a backlight, and a stack of layers traversed by light emitted from the backlight, wherein the stack of layers includes a masking layer comprising an array of optical elements, and a display layer including an array of amplitude light modulators, wherein the array of optical elements includes at least two types of optical elements, wherein the types differ in their output angular distribution.

12 Claims, 6 Drawing Sheets

(56) References Cited

U.S. PATENT DOCUMENTS

| | | | | |
|---|---|---|---|---|
| 2019/0011718 | A1* | 1/2019 | Roelen | G02B 30/27 |
| 2019/0155105 | A1* | 5/2019 | Aieta | G02B 6/0036 |
| 2021/0240004 | A1 | 8/2021 | Roelen et al. | |
| 2022/0197052 | A1* | 6/2022 | Makinen | G02B 3/0037 |

FOREIGN PATENT DOCUMENTS

| | | | |
|---|---|---|---|
| WO | 2014/033699 | A2 | 3/2014 |
| WO | 2017/114839 | A1 | 7/2017 |
| WO | 2017/118469 | A1 | 7/2017 |
| WO | 2017/204840 | A1 | 11/2017 |
| WO | 2021/110936 | A1 | 6/2021 |

OTHER PUBLICATIONS

Extended European Search Report issued in corresponding application, EP 21187482.1; dated Jan. 21, 2022.

Deng, Y. & Chu, D., "Coherence properties of different light sources and their effect on the image sharpness and speckle of holographic displays", Scientific Reports, 2017, 7(1), 1-12. (Cited in specification and ISR).

* cited by examiner

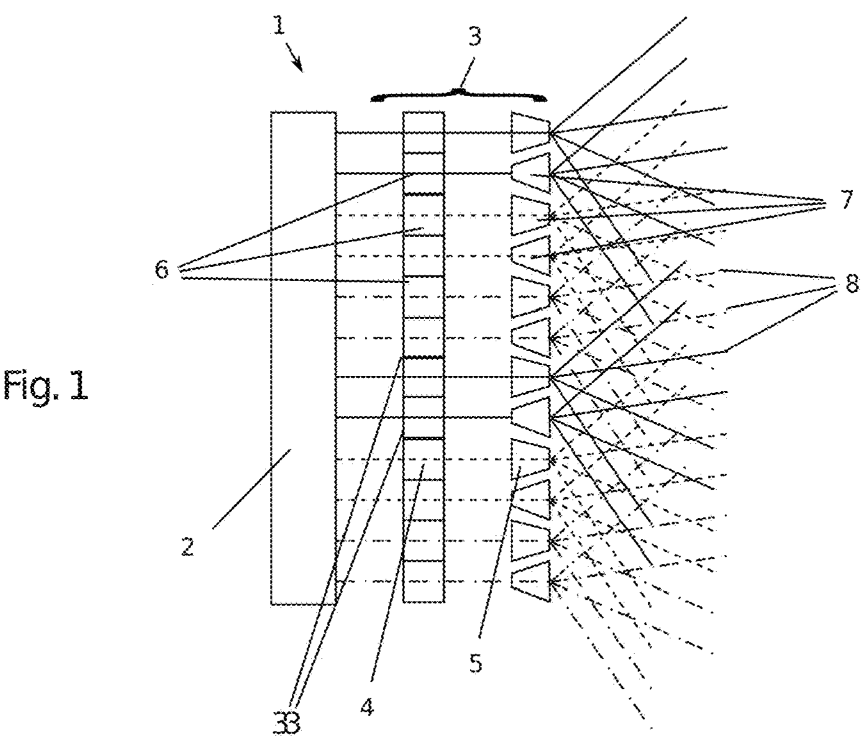
Fig. 1
Fig. 2
ΔS
9
10
8
7
12
13
11
25
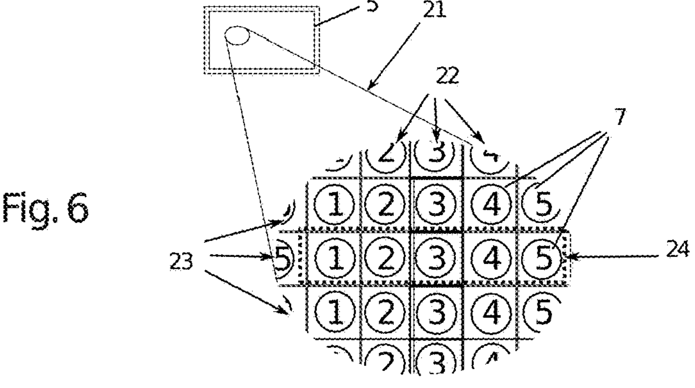
Fig. 6

STEREOSCOPIC DISPLAY DEVICE

CROSS-REFERENCE TO RELATED APPLICATIONS

This application is a U.S. National Stage entry of PCT/EP2022/070583, filed Jul. 22, 2022, which claims benefit of priority to European application 21187482.1, filed Jul. 23, 2021, the entire disclosures of which are hereby incorporated herein by reference.

FIELD OF THE INVENTION

The disclosure concerns a display device comprising: a backlight and a stack of layers traversed by light emitted from the backlight, wherein the stack of layers comprises: a masking layer comprising an array of optical elements and a display layer comprising an array of amplitude light modulators. In particular, the disclosure concerns a stereoscopic display for one or more viewers, more specifically a naked-eye stereoscopic display, that is, one that works without filters or shutters to be worn by a viewer.

BACKGROUND OF THE INVENTION

Such display devices require that the images perceived by the eyes of a viewer can differ. This is achieved by separating, which part of the light transmitted through the display layer arrives at which eye. Vice versa, each eye of the viewer can "see" only a subset of the amplitude light modulators—and the subsets differ between the eyes.

A display device of type defined in the outset is disclosed in U.S. Pat. No. 10,298,921 B1. In this example, the masking layer comprises a lenticular lens that is used as a parallax generator. It generates an angle-dependent view of the underlying display layer. The light originating from each pixel is directed and emitted under a particular viewing angle or, more precisely, within a narrow range of viewing angles to provide one view at a time. The viewing angle for each pixel is fixed and permanent. Different pixels are associated with different viewing angles and therefore views, in order to provide the desired number of views over the available field of view. One disadvantage of this solution is that the number of pixels required from the display layer increases proportionally to the number of views that shall be provided. Correspondingly, for a fixed total resolution the display layer, the resolution perceived for any given view (that is, per-eye) is a fraction of that total resolution, wherein said fraction is inversely proportional to the number of views that shall be provided. In other words, grouping pixels and assigning a single view to each pixel within the group comes at the cost of a decreased spatial resolution. For example, if three views are required, each lenticular (micro) lens covers three pixels and the overall spatial resolution will scale by ⅓. A much larger number of views is however normally desired to recreate a natural 3D viewing experience. In practice, as much as N=50-100 views are desired just for horizontal parallax, leading to a drop of the spatial resolution per view by 1/N.

In more demanding applications, where the vergence-accommodation conflict problem should be addressed with appropriate focus cues, several views may have to be available for capturing by each pupil diameter, implying an increase of the total number of views N and a dramatic decrease of spatial resolution. This negative scaling of the spatial resolution is critical, even for high-end displays (e.g. 8K, with 33 million pixels), setting the demand for new designs, which exploit the pixel resources more efficiently.

Another display device of the type defined in the outset, with the potential of an improved use of the pixel resources, is disclosed in EP 2 521 368 A2. This device is based on a parallax barrier system, essentially shadowing different pixels at different viewing angles. In principle, the same pixel can be visible from different spaced viewing angles. However, due to the fundamental importance of absorption, the solution is inherently inefficient energy wise.

A third display device of the type defined in the outset is disclosed in WO 2017/114839 A1. In this device, similarly to the first device mentioned above, a lenticular lens is employed to limit the viewing angle for each pixel. In contrast to the first device, the lenticular lens is spaced from the display layer allowing the same pixel to be viewed through different congruent lenses. However, the viewing angles for neighboring pixels overlap considerably. To achieve separate and independent views, the device uses a steering collimated backlight that effectively performs a second masking function before the display layer. This requires a backlight having a multiple segments per pixel to select a direction for each active pixel. The viewing angle of this device is limited by the properties of the lenticular lens array as pixels offset from the central axis of a particular lenticular lens are increasingly out of focus.

BRIEF SUMMARY OF THE INVENTION

It is an objective of the present disclosure to provide a display device of the type defined in the outset that resolves or alleviate at least some of the problems in the prior art.

The disclosure proposes a display device as defined in the outset, wherein the array of optical elements comprises at least two types of optical elements, wherein the types differ in their output angular distribution. Within the present disclosure, an optical element is defined as a continuous structure having a structural and/or material boundary, wherein the boundary is defined in that the output angular distribution (or angular distribution of transmitted light) is the same or changes continuously as a function of the position on the surface of the optical element within the boundary. At least two types of optical elements, wherein the types differ in their optical angular distribution, means that optical elements behave differently when transmitting light depending on which type they are. In other words, light arriving from an input direction and transmitted through an optical element may leave the optical element in a different output direction depending on which type the optical element is, at least for some input directions. The lenticular arrays or barrier arrays disclosed in the prior art consist of many optical elements, wherein all optical elements are of the same type and have the same output angular distribution for a given input. The optical elements may be distributed approximately evenly among the types. In other words, the number of optical elements associated with each type may be approximately equal.

Regarding the display layer and specifically the amplitude light modulators, the present disclosure refers to amplitude light modulators that can be switched individually, meaning that they each have at least two possible states and the state of each amplitude light modulator can be controlled independently. For example, the amplitude light modulators are electronically modulated optical devices. Each amplitude light modulator corresponds to a pixel or a sub-pixel of a graphical display. For example, the array of amplitude light modulators can be part of a liquid-crystal display stack, more specifically such as in a thin-film-transistor liquid-crystal display (TFT LCD).

In one embodiment, the display layer may be arranged between the backlight and the masking layer. This allows to keep the backlight collimated through the display layer. If, for example, the display layer comprises liquid crystals, the performance of the display layer is higher when the transmitted light is collimated.

Each type of optical elements may suppress at least one range of directions of transmission. A range of directions may refer to an angular range or range of angles. For example, in case of only two types of optical elements, a first type of optical elements may suppress a first range of directions in which a first eye of the viewer is likely located and a second type of optical elements may suppress a second range of directions in which a second eye of the viewer is likely located. Directions of transmission outside the at least one suppressed range are permitted and can pass the respective optical element. The suppressed light is effectively hidden from an eye in the cone/slice of suppressed directions. In case of three or more types of optical elements, the suppressed ranges of any two types may at least partially overlap.

In one embodiment, each type of optical elements may suppress transmission to all directions within at least one range of azimuthal angles defined in a reference plane normal to the masking layer. The suppression may be irrespective of polar angle. The reference plane may be the same for all optical elements. The aspect ratio of the display may be such that the reference plane is parallel to a longer edge of the display. Typically, the display may be foreseen to be used in an arrangement where the reference plane is a horizontal plane. The effect achieved by suppressing light transmission within at least one range of azimuthal angles is that the suppressed directions essentially form slices, e.g. vertical slices. The image perceived by a viewer is then independent from the polar angle, meaning that the viewer can move vertically with respect to the display device without changing what they see.

For example, each type of optical elements may suppress transmission to all directions within multiple ranges of azimuthal angles. The light between those multiple ranges is transmitted. This effectively leads to a fan out of transmitted light. More particularly, this example achieves the production of suppressed parallel stripes. The light transmitted between those stripes provides for efficient re-use of pixels for multiple viewing angles.

In this context, the multiple ranges may optionally be equal in size and distance from each other. The size and distance may be measured in angular coordinates. This configuration of the optical elements achieves a regular pattern of suppressed or transmitted light, which facilitates homogeneous capabilities, in particular homogenous perceived brightness, of the display device over the range of viewing angles. It also facilitates selection and use of the current pixels for creating the perception of an undisturbed image under the given viewing angle, that is, for each eye of a viewer respectively.

More specifically, the at least two types of optical elements may differ in an azimuthal offset of their respective multiple ranges. The azimuthal offset is an angular offset in the reference plane defined above. In particular, the azimuthal offset may be the only difference regarding the output angular distribution of the types of optical elements. Otherwise, the output angular distribution of the types may be similar. These similarities of the general parameters of the optical elements (e.g. diffractive optical elements, DOEs) may facilitate their specification and production.

Optionally, the array of optical elements may comprise at least eight types of optical elements, in particular at least ten types of optical elements. It has turned out that a number of at least eight types provides enough flexibility to accommodate different viewing angles and viewing distances of a single viewer while keeping overlaps (perceived optical "cross talk") between images intended for each eye at an acceptable level.

According to another option, the optical elements may be arranged in groups, wherein each group comprises exactly one optical element of each type. Each group typically consists of optical elements in close vicinity, for example contiguous. A group may thus also be referred to as neighborhood. By arranging the optical elements in such groups, wherein all groups may be similar in their arrangement of the optical elements associated with each type, a homogeneous image resolution may be achieved over the entire display area. The invention is not limited to configurations where the groups or grouped optical elements cover the entire area of the masking layer. In general, there may be (wholly transmissive, reflective or absorptive) gaps between all or some groups and/or there may be ungrouped optical elements to perform different functions.

For example, each group may consist of two or more rows and two or more columns of optical elements in each row. Compared to the general case, which is covering also arrangements with only one row or only one column, this arrangement avoids large jumps between (that is, large differences in the positions of) optical elements belonging to neighboring groups. For example, assuming two rows, the optical elements may be arranged such that each optical element has (at least) two optical elements arranged next to it whose types among all other types have the most similar output angular distribution to the type of the respective optical element (e.g. if the types differ only in an azimuthal offset, the two neighboring optical elements are those with the smallest positive and smallest negative difference in azimuthal offset). When looking at the group as a list of types, the "last" element may be arranged between the one but last and the "first" element. The "group overflow" is no different than any other single transition within the group. On the other hand, if the optical elements were arranged in a single row, the group overflow would result in a jump across the entire group, which could be perceived almost like a single-pixel jump of the entire image.

Optionally, at least some of the optical elements are diffractive optical elements (DOEs). In a particular embodiment, all optical elements are DOEs. The masking layer may for example be a pure DOE layer or it may be a hybrid layer combining DOEs and other optical elements. DOEs have the advantage that they provide more freedom regarding the optical design, e.g. of the output angular distribution. The optical configuration is more flexible. Generally, DOEs can perform optical functions at higher angles and thus cater to a larger range of viewing angles than refractive optical elements.

In general, the invention also concerns an application with a DOE masking layer between the backlight and the display layer. At that position, the masking layer may act as steering the backlight to effectively form a first directional filter. Or it may shape the output angular distribution prior to the display layer.

According to one embodiment, the masking layer comprises two overlapping arrays of optical elements, wherein the optical elements in a first array are responsible for shaping a transmitted beam in a first plane normal to the masking layer and the optical elements in a second array are responsible for shaping a transmitted beam in a second plane normal to the first plane and to the masking layer. If, for example, one of the two layers performs the type-specific shaping of the output angular distribution, the other layer may provide general shaping of the output angular distribution, i.e., which concerns all optical elements irrespective of their type. For example, the first array alone may be configured to perform pixel-dependent beam shaping and comprise the different types of optical elements for that purpose. Specifically, the first array may create the azimuthal fan out profiles mentioned earlier in the reference plane. The second array on the other hand may be configured to achieve homogeneous beam forming, e.g., homogeneous beam spreading in the second plane normal to the reference plane and the display plane.

With respect to the same embodiment, the optical elements of the first array may be diffractive optical elements and the optical elements of the second array may be refractive optical elements. Specifically, there may be only one type of refractive optical elements used for beam spreading. For example, the second array may be a lenticular lens with horizontal segmentation.

In the context described above, the backlight is configured to provide coherent light. Coherent light refers to light having an emission linewidth at full-width-half-maximum below 5 nanometers (FWHM<5 nm). One advantage of coherent light is that DOEs can achieve a higher performance than with incoherent light, wherein performance relates to the sharpness of the achievable output angular distribution and to the range of outermost viewing angles. The performance gains attributed to coherence properties are discussed in "Coherence properties of different light sources and their effect on the image sharpness and speckle of holographic displays" by Deng, Y., & Chu, D. (2017; *Scientific reports,* 7(1), 1-12).

In a similar embodiment, the backlight may comprise an optical device having at least a first waveguide and at least a second waveguide for guiding a light beam emitted from a light source, wherein the light beams guided by different waveguides arrive at different areas of the masking layer, wherein the light beam arriving at the masking layer from each waveguide is coherent. The optical device may be of the type disclosed in WO 2021/110936 A1. This type of optical device is capable of providing coherent light—with the advantages mentioned above in the context of the present disclosure—over a large display surface while keeping the necessary backlight arrangement compact and slim. It is thus a particularly suitable application and provides a synergistic effect to use such an optical device in the context of the present disclosure. Ideally, each of the waveguides provides a coherent light beam arriving at the masking layer. Between different light beams no coherence is necessary. Optionally, the light beams from all or essentially all waveguides may be coherent.

Optionally, at least for a part of the display area the number of optical elements within that part of the display area may be more than half the number of amplitude light modulators within that part of the display area. In one particular embodiment, the number of optical elements may equal the number of amplitude light modulators within that part of the display area or—optionally—for the majority or all of the display area. In case of a color display and where multiple amplitude light modulators are used as sub-pixels together representing a single colored pixel, the above relations can optionally take the multiplicity of sub-pixels into account. Typically, the ratio of optical elements and pixels will increase proportional to the number of colors. For example, in case of three sub-pixels per image pixel, the number of optical elements may be approximately three times the number of pixels.

The control of the display device and specifically the decision on which pixels or sub-pixels to activate to achieve a stereoscopic view for one or more viewers requires knowledge of the position of each viewer relative to the display device. More specifically, the viewing angle and distance from the display device for each eye of the viewer can be used to identify the optical elements that transmit light to the respective eye. Then, depending on the images that shall be shown to each eye, and their respective differences or commonalities, the selection of activated pixels or sub-pixels is such that the pixels used to show differences are limited to those associated with optical elements that suppress light in the direction that would (also) be perceived by the respective other eye. On the other hand, pixels used to show commonalities may be once associated with optical elements that transmit light in the direction of both eyes.

BRIEF DESCRIPTION OF THE DRAWINGS

By way of example, the disclosure is further explained with respect to some selected embodiments shown in the drawings. However, these embodiments shall not be considered limiting for the disclosure. In the drawings:

FIG. 1 schematically illustrates a first embodiment of a display device according to present disclosure with at least three types of optical elements;

FIG. 2 schematically illustrates the output angular distribution of a single optical element belonging to the masking layer of a display device according to the present disclosure;

DESCRIPTION OF EXAMPLE EMBODIMENTS

Figures 3, 4, 5:
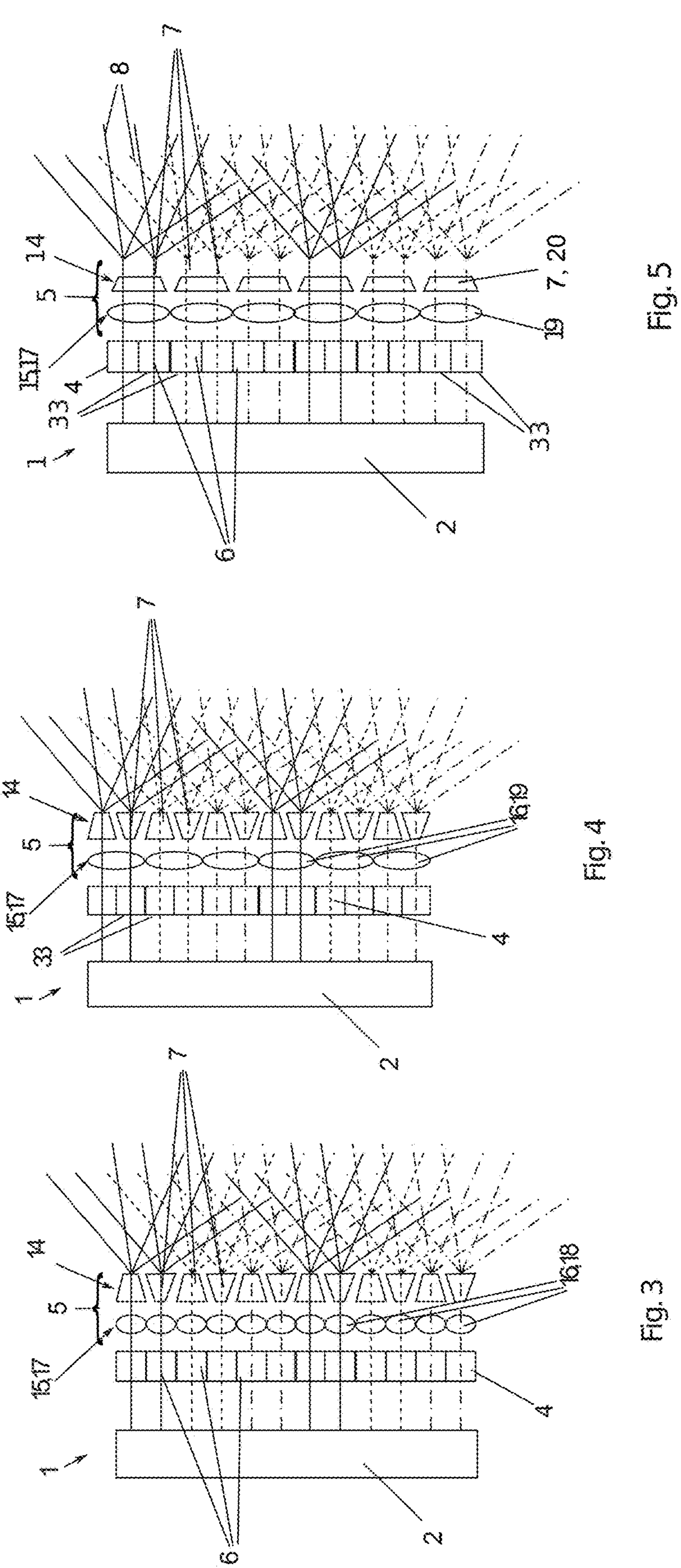
FIG. 3 schematically illustrates a second embodiment of a display device according to present disclosure with a lens array.
FIG. 4 schematically illustrates a third embodiment of a display device according to present disclosure with a multicolor lens array.
FIG. 5 schematically illustrates a fourth embodiment of a display device according to present disclosure with a multicolor lens array and multicolor optical elements FIG. 6 schematically illustrates an exemplary arrangement of optical elements of five different types in the masking layer of the display device.

FIG. 1 schematically shows a vertical cut of a display device 1 according to the present disclosure. The display device 1 comprises a backlight 2 and a stack 3 of layers 4, 5 traversed by light emitted from the backlight 2. The stack 3 of layers 4, 5 comprises a masking layer 5 and a display layer 4. The display layer 4 comprises an array of amplitude light modulators 6. In this example, the display layer 5 is arranged between the backlight 2 and the masking layer 5.

The masking layer 5 comprises an array of optical elements 7. The optical elements 7 can be diffractive optical elements (DOEs). Each optical element 7 has a particular output angular distribution 8. The different shapes of the optical elements 7 indicate two different wavelengths (i.e. color) of the light traversing the respective elements (amplitude light modulators 6 and optical elements 7). The different shades indicate three different types of optical elements, which differ in their output angular distribution 8. Thus, in FIG. 1, two groups of optical elements 7, each consisting of three types of optical elements, of a two-color display device are schematically illustrated. In this example, different wavelengths are associated with separate optical elements 7.

The output angular distribution 8 of a single optical element 7 is schematically illustrated in FIG. 2, with M=14 output rays 9 displaced horizontally and stretched vertically, to span the intended field of view (FOV) 10, that is, the horizontal FOV 11 and the vertical FOV 12. As, thereby, the emission pattern is invariant in the vertical direction, the following detailed description and drawings are simplified by referring only to the horizontal distribution. They essentially regard a projection of the output angular distribution 8 into a horizontal reference plane 13. The separation between rays at a viewing distance z is $\Delta S = z \tan(\Delta\theta)$, where $\Delta\theta$ is the angular separation between adjacent output rays 9.

The term "ray" in this disclosure generally refers to light having a direction of propagation continuously (but not necessarily homogeneously) distributed over a limited solid angle. The distribution of directions of different rays and, hence, their respective solid angle, in general differs. This definition of "rays" includes "beams", such as those produced by lasers. For the optional special case of Gaussian optics, "rays" may be replaced with "beams" in understanding the present disclosure.

To specify the properties of the DOEs and show the feasibility of the disclosed device, simulations of DOEs have been performed which take a single laser beam as input and split it into N beams with an angular separation $\delta\theta$ in the x-axis. The $FOV = N \times \delta\theta$ should be larger than e.g. 50 deg. In particular, a relation between FOV and uniformity error (difference in power between the different rays) has been evaluated. The uniformity error is the relative difference in power between different diffraction orders. The diffraction efficiency is the fraction of input power which is diffracted into the desired orders. The stray light is the maximum intensity of light outside the signal region. Different feature sizes of the DOE have been simulated for different values of N. The DOE has a pixelated transmission function. The feature size is the lateral dimension of the said pixels. For each pixel area, a constant phase is added to the input field. The transmission function may take a discrete number n of possible values (e.g. two possible values: 0 or pi). It is then said to be an n-level phase mask (in the example: a 2-level phase mask).

It turns out that for any feature size and n-level phase mask, an increase of the FOV leads to an increase of the uniformity error. The efficiency is not significantly affected by FOV, but by the number of phase levels. 2-level DOEs may be adequate for significantly relaxed requirements on FOV; 4-level DOEs with features size $\Lambda$=300 nm can be used for FOV up to 50 deg (uniformity error e<=10%); and 8-level DOEs with feature size $\Lambda$=50-100 nm can extend the FOV to 90 deg and further while keeping the uniformity error below 108. Taking existing off-the-shelf technology specifications as a reference, the minimum DOE feature size is 50 nm with up to 16 phase-levels. Therefore, the mentioned requirements can be met with current commercial solutions.

To provide the functions of suppressing certain ranges in one direction and broadening the beam in the other direction, the masking layer 5 may perform both functions with a single array of optical elements 7 or alternatively comprise two overlapping arrays of optical elements as shown in FIGS. 3, 4 and 5. The optical elements 7 in a first array 14 may then be responsible for shaping a transmitted beam in a first plane normal to the masking layer. The optical elements in a second array 15 may be responsible for shaping a transmitted beam in a second plane normal to the first plane and to the masking layer. The optical elements 7 of the first array 14 can be diffractive optical elements and the optical elements 16 of the second array 15 can be refractive optical elements.

In order to expand the vertical FOV 12 in this way, there are several possible implementations, diffractive and refractive. One way of doing it is by using a lenticular array 17—a one dimensional array of cylindrical lenses 18—to form the second array 15 as shown in FIG. 3 and in the prior art cited in the introduction, albeit in a completely different setting.

In case of a multicolor display, the lenticular array 17 may comprise separate cylindrical lenses 18 for each color or multicolor cylindrical lenses 19 may be used as schematically shown in FIG. 4. Furthermore, in general also the optical elements 7 of the first array 14 of the masking layer 5 may be multicolor optical elements 20 capable of providing the desired beam shaping to two or more different wavelengths of light. The light modulators 33 indicated in the same shade correspond to different colors (for example, red, green and blue) and associated sub-pixels of the same pixel. The different shades—as discussed in connection with FIG. 1—indicates the different output angular distributions (due to the different types of optical elements 7).

The array of optical elements 7 responsible for the beam shaping in the reference plane comprises at least two types of optical elements 7. FIG. 6 schematically shows a front view of the masking layer 5 with a detail 21 showing the arrangement of the optical elements 7. In this example, optical elements 7 of five different types ① to ⑤ are represented. The optical elements 7 are arranged in columns 22 and rows 23, wherein the columns 22 are assigned different types according to a repeating sequence of all types. The optical elements 7 of the masking layer 5 are arranged in groups 24. Each group 24 comprises exactly one optical element 7 of each type ① . . . ⑤. In the example shown in FIG. 6, the types of optical elements 7 repeat periodically within each row 23. Each group 24 is formed by as many adjacent optical elements 7 in a row as there are types, containing one optical element of each type.

The at least two types of optical elements 7 differ in their output angular distribution 8. Each type of optical elements 7 suppresses at least one range 25 of directions of transmission. In this example, the at least two types of optical elements 7 differ in an azimuthal offset of their respective multiple ranges 25.

Figure 7:
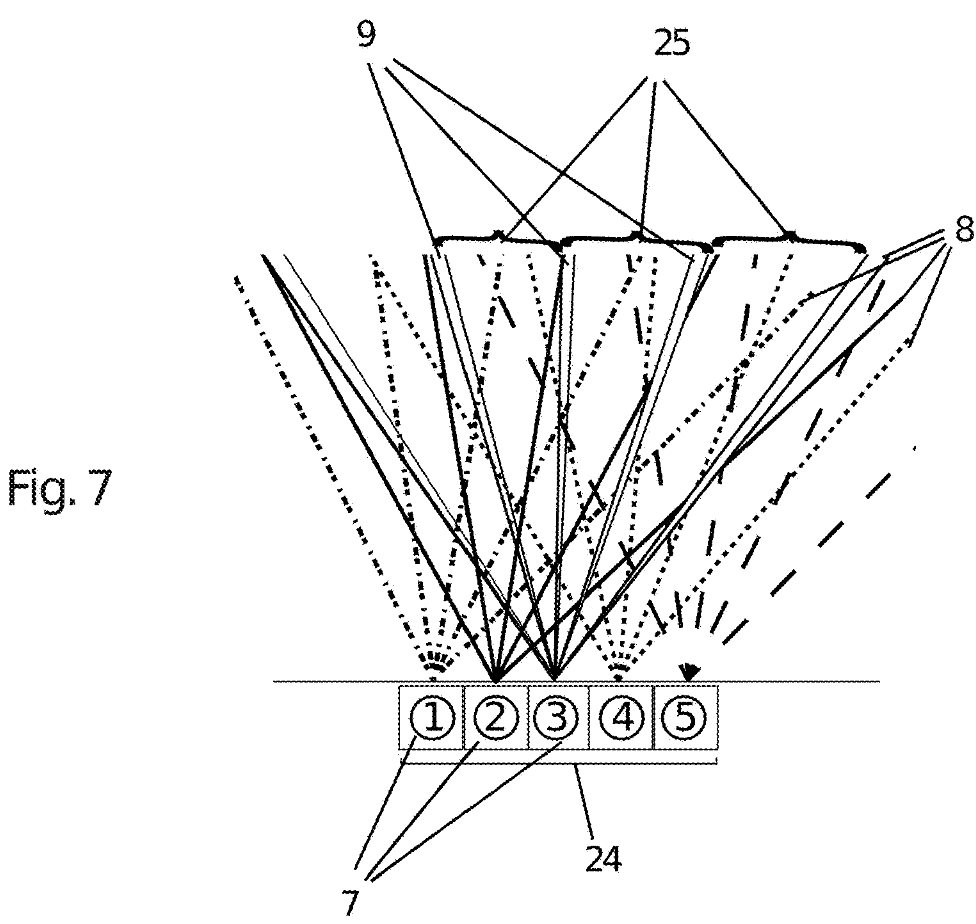
FIG. 7 schematically illustrates the output angular distribution in a reference plane of the optical element types of a single group shown in FIG. 3.

Each type of optical elements 7 suppresses transmission to all directions within multiple ranges 25 of azimuthal angles defined in a reference plane 13 normal to the masking layer 5 (see FIG. 2). The multiple ranges 25 are equal in size and distance from each other. In the embodiment shown in FIG. 7 and FIG. 8, only a single group 24 of optical elements 7 of the masking layer 5 is shown and only for a single color (or for multicolor optical elements 20). Each type (indicated in the drawings by a different combination of color and pattern) has a different output angular distribution 8, parameterized by the number M of rays 9, the average emission angle $\overline{\theta}_t$, which is the average of the emission angles $\theta_i$ of all rays 9 i=1 . . . M, the angular aperture $\theta_{ap}$ of each ray 9 and the angular separation $\Delta\theta$ between adjacent rays, i.e. their centers. The rays 9 are achieved by suppressing the ranges 25 of directions of transmission between the rays 9. In this example, only the average emission angle $\overline{\theta}_t$ differs between the different types t=1 . . . T of optical elements, where T is the number of types, with a relative angular offset $\delta\theta$ between types having adjacent rays $\delta\theta=\overline{\theta}_{t+1}-\overline{\theta}_t$, while the other parameters are invariable across all types. $\Delta\theta$ and $\delta\theta$ are related by: $\Delta\theta=T\times\delta\theta$.

Figure 8:
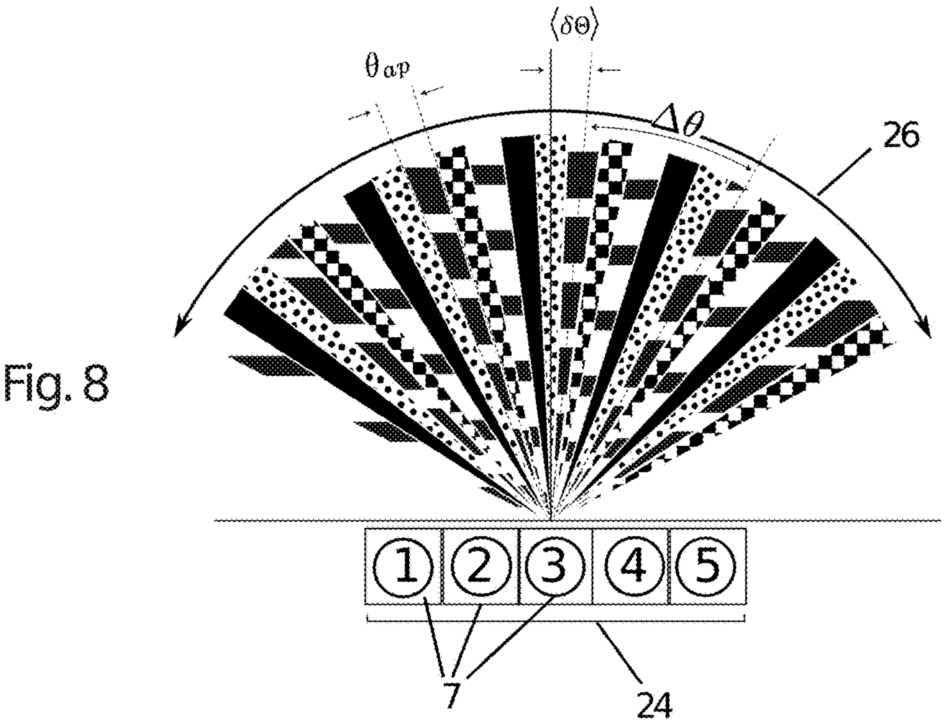
FIG. 8 schematically illustrates a simplified parameterisation of the total output angular distribution with regard to the entire group of FIG. 7.

When the output angular distributions 8 of the different types of optical elements 7 are considered together in the angular space, they discretize the angular field of view 26 of the display device 1 in M×T steps—see FIG. 8 schematically illustrating the fan out achieved by a single group 24 of optical elements 7. The variables M, T, $\Delta\theta$ and $\overline{\theta}_t$ are specified by the design of the DOEs forming the optical elements 7.

The angular divergence $\theta_{ap}$ of the rays is fixed by the width of the gaussian beams at their waist position:

$$\theta_{ap} = \frac{2\lambda}{n\pi\omega_0} \qquad \text{(Eq. 1)}$$

where $\lambda$ is the wavelength, n the medium refractive index of the propagation medium (e.g. air) and $\omega_0$ is the waist radius.

Figure 9:
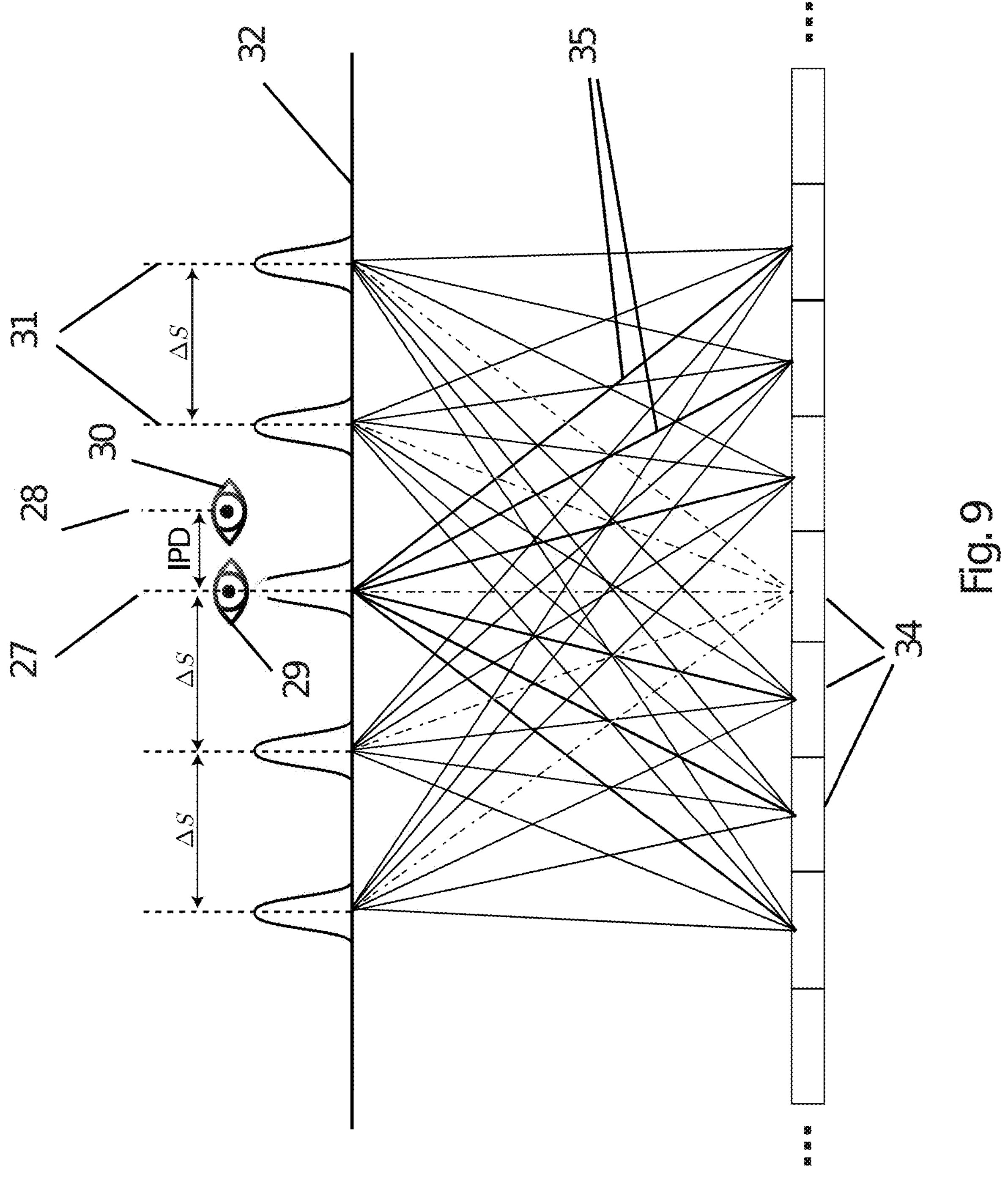
FIG. 9 schematically illustrates the formation of view zones by a so-called pixel assignment pattern (PAP), for one eye of the viewer.

To generate binocular disparity, the display device 1 should be able to produce two independent perspectives of the scene, aimed at different active view zones 27, 28, each containing one eye 29, 30, as is schematically illustrated in FIG. 9. The idle zones 31 indicate alternative positions in the viewer plane 32, where the same image could be perceived as in the corresponding active view zone 27. To achieve binocular disparity essentially over the entire display area, the number of optical elements 7 responsible for shaping the output angular distribution 8 is about the same as the number of amplitude light modulators 33 of the display layer 4 (that is, the number of pixels or the number of sub-pixels, e.g. one for each color, if applicable).

In FIG. 9, each display region 34 (indicated by different combinations of colors and patterns) in the pixel assignment pattern (or PAP), covers several (e.g. 10-100) groups 24 of optical elements 7. Within such a display region 34, only one type of optical elements 7 is active to contribute to the image (in the active view zone 27—images in other active view zones may receive contributions from other types within the same display region or groups). As illustrated in FIG. 9, each PAP generates a group of view zones 27, 31, with one active and several idle views. The rays 35 in black contribute to the illumination of the active view zone 27, where e.g. the right eye 29 lays. For the purpose of illustration, some features in this image are distorted: it does not preserve the relative scale of the display plane, the viewer plane and their separation; moreover, contrarily to this figure, the angular separation between the rays emerging from a single type of optical element is always constant.

The number of types of optical elements 7 in the masking layer 5 is a function of the required homogeneity of the illumination of the view zones 27, 28 and of the maximum acceptable cross talk between simultaneously active view zones 27, 28, e.g., in case of a single viewer, the right and left eye view zones.

Figure 10:
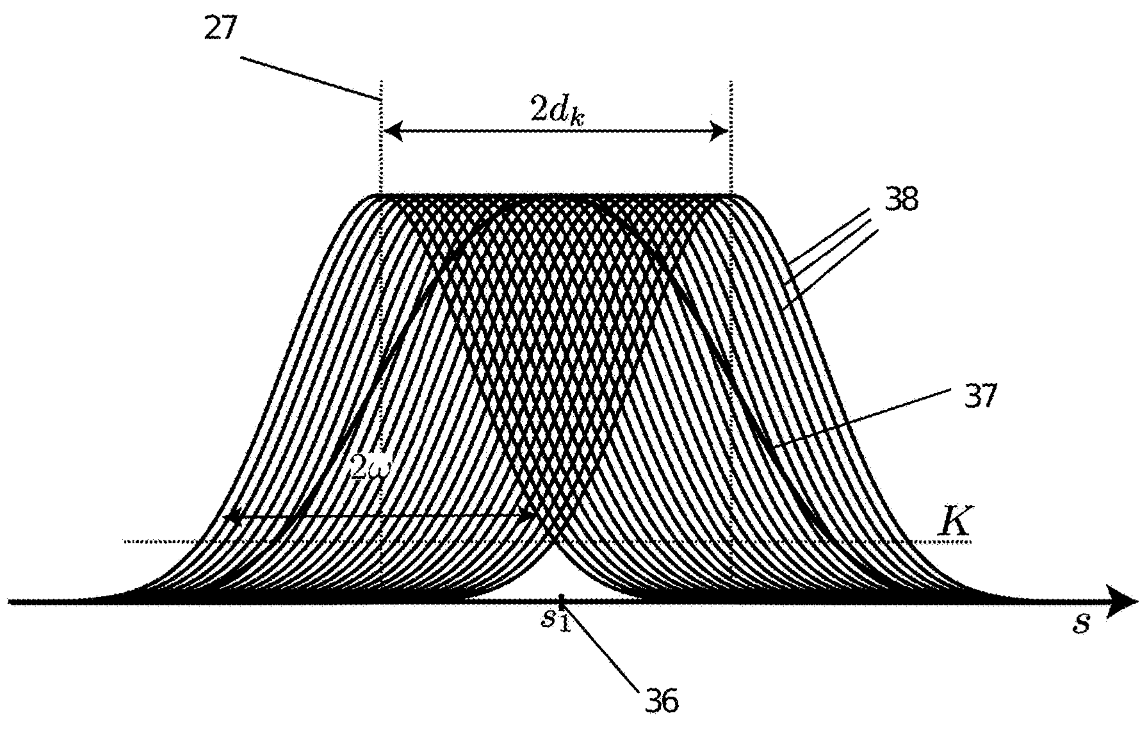
FIG. 10 schematically illustrates the generation of an active view zone by the sum of gaussian beams originating in different regions of the screen.

The homogeneity requirement essentially defines how precisely the ranges of light transmitted by the masking layer 5 must overlap with the active view zone 27, 28. Assuming a Gaussian profile, perfect homogeneity would require that the center of the ray 35 from each pixel overlaps exactly at the center of the active view zone 27. But also close to the center, variations in brightness are relatively small. Assuming that brightness fluctuations below 5% are imperceptible to the human eye, corresponding small offsets between the center of the un-suppressed range of the optical element type providing the active view zone and the center of the active view zone itself may be acceptable. In general, multiple types of optical elements 7 within the same group 24 may be used to provide brightness to the active view zone 27, 28. FIG. 10 schematically illustrates the influence of the offset between the center 36 of the view zone 27 and the center of the incoming light rays on the homogeneity. A particularly low homogeneity constraint K corresponding to a high acceptable fluctuation was chosen in this figure for visual clarity. The dark gray curve 37 represents the averaged sum of all the individual gaussian beams 38, represented with a fainter line. The beams 38 are displaced from the center 36 of the view zone 27 by a maximum displacement $d=d_k$, for which the intensity at $s=s_1$ drops to K (a design parameter). A higher value of K corresponds to a higher homogeneity of the brightness of the screen as perceived by the viewer at $s=s_1$. K may typically be larger than 95%, such that brightness fluctuations are imperceptible to the eye.

Figure 11:
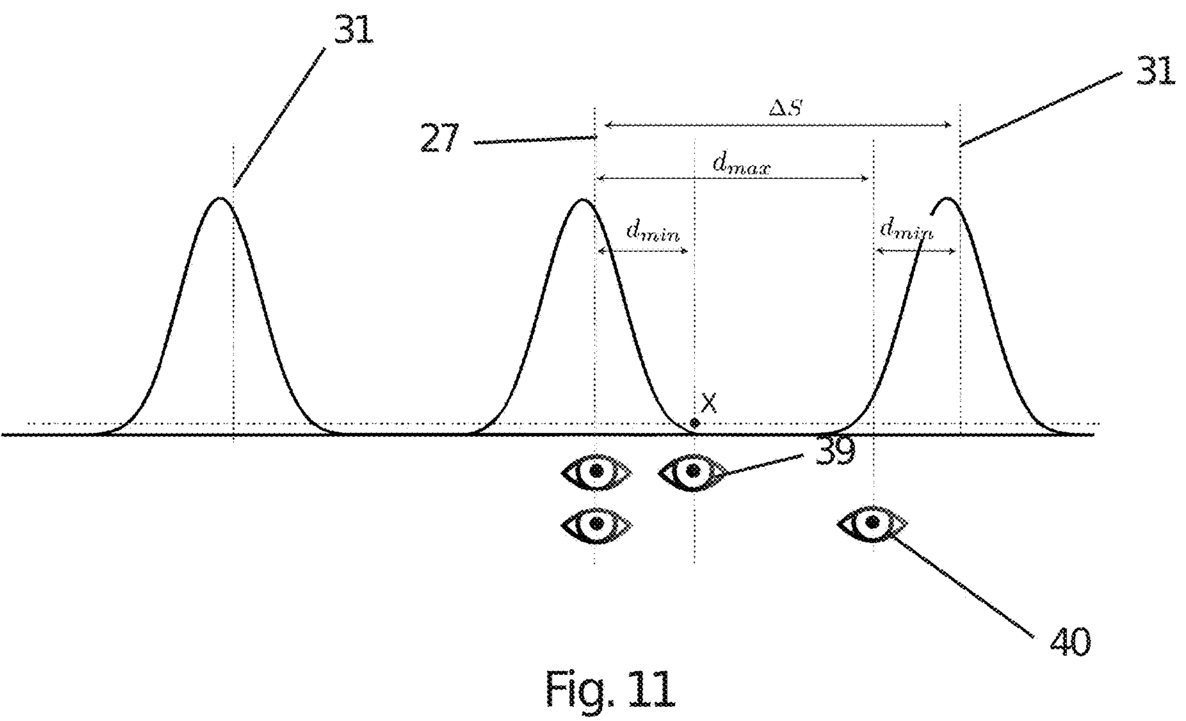
FIG. 11 schematically illustrates the cross-talk between left and right eye of a viewer.

The second requirement concerning the maximum cross talk X is schematically illustrated in FIG. 11. The activated pixels generate periodically spaced view zones 27, 31, separated by $\Delta S$. The eye position determines the active zone 27; $d_{min}$ corresponds to the minimum interpupillary distance 39 and is defined as the separation from the center of the active view zone 27, where cross-talk drops below X. X is a design parameter; $d_{max}$ sets the maximum interpupillary distance 40, corresponding to the separation from the active view zone 27, where cross-talk equals X, due to the adjacent idle view zone 31.

Assuming an interpupillary separation between 51 and 77 millimeters and a viewing distance of z=1 meter, the following configurations concerning the output angular distribution 8 of the optical elements 7 of the masking layer 5 and the number T of types of optical elements 7 within the masking layer 5 having a different output angular distribution 8, that is with a relative azimuthal offset $\delta\theta$, can be calculated:

| # | X - cross talk | K | $\Delta\theta$ [°] | $\delta\theta$ [°] | $2d_k$ [mm] | $\omega$ [mm] | $\omega_0$ [um] | T - pixel types |
|---|---|---|---|---|---|---|---|---|
| 1 | 0.1 | 0.95 | 7.29 | 0.76 | 13.2 | 41.4 | 4.90 | 8.6 |
| 2 | 0.05 | 0.95 | 7.29 | 0.68 | 11.8 | 36.8 | 5.50 | 9.8 |
| 3 | 0.01 | 0.95 | 7.29 | 0.56 | 9.7 | 30.4 | 6.67 | 12.1 |
| 4 | 0.001 | 0.95 | 7.29 | 0.46 | 0.8 | 25.2 | 8.02 | 14.7 |

-continued

| # | X - cross talk | K | Δθ [°] | δθ [°] | $2d_k$ [mm] | ω [mm] | $\omega_0$ [um] | T - pixel types |
|---|---|---|---|---|---|---|---|---|
| 5 | 0.01 | 0.9 | 7.29 | 0.77 | 13.4 | 29.1 | 6.94 | 8.5 |
| 6 | 0.01 | 0.93 | 7.29 | 0.65 | 11.3 | 29.8 | 6.79 | 10.2 |
| 7 | 0.01 | 0.95 | 7.29 | 0.56 | 9.7 | 30.4 | 6.67 | 12.1 |
| 8 | 0.01 | 0.96 | 7.29 | 0.50 | 0.9 | 31.0 | 6.60 | 13.5 |
| 9 | 0.01 | 0.99 | 7.29 | 0.26 | 0.4 | 32.0 | 6.32 | 27.0 |

It turns out that starting from at least eight types (T=8) of optical elements 7 an acceptable homogeneity can be achieved, although with significant crosstalk (configuration #1) or an acceptable crosstalk with however noticeable fluctuations in homogeneity (configuration #5). Starting from at least ten types (T=10) of optical elements 7, those disadvantages can be significantly reduced (configurations #2 and #6). With twelve or more types (T≥12), fluctuations as well as crosstalk should be unnoticeable.

If the display device 1 is meant to cover a wider range of interpupillary separation and/or viewing distances, a higher number of types of optical elements T may be desirable. Most autostereoscopic designs assume a fixed viewing distance, outside which the views are mixed, leading to blur. The present disclosure includes the possibility to create view zones at a variable viewing distance z, with no image deterioration. This is possible by accounting for the divergence of the Gaussian beams with propagation in the design and control of the pixel types.

As each group of optical elements has only one active type of optical element per eye, increasing the number of types (T) means a reduction of the spatial resolution of the display by 1/T. Comparing with other light field implementations where the resolution scales as 1/N, where N=number of views, the proposed scheme presents a significant advantage: it is capable of generating a continuum of views (and not a discretized set) at the cost of a constant trade-off of resolution.

In an alternative embodiment to FIG. 6, each group 24 may consist of two or more rows 23 and two or more columns 22 of optical elements 7 in each row. Arranging the groups 24 in a rectangular lattice instead of in a single row, a masking layer 5 with twelve types of optical elements (T=12) could be implemented by arranging the optical elements in groups of 4×3. This has the advantage that the impact of the masking layer on the resolution of the display layer can be distributed in horizontal and vertical directions, leading for example to a ¼ decrease of the horizontal resolution and a ⅓ decrease of the vertical resolution of the display layer.

Taking the example of a 32 inch (70.9×39.9 cm) display with 8K resolution (7680×4320 pixels, 33.2M pixels), which has a 92 μm pixel pitch (53.3 μm sub-pixel pitch), after grouping the pixels in groups of 4×3 pixels, the horizontal pixel pitch would be 368 μm and the vertical 276 μm. At the viewers plane at a distance of z=1 m, this amounts to an angular resolution of 0.37 mrad and 0.28 mrad, close to the limit of the human eye resolution (0.3 mrad) and therefore the display device 1 is expected to not show disturbing levels of pixelation despite the continuum of views.

The backlight 2 is configured to provide coherent light or laser light. As defined before, coherent light refers to light having an emission linewidth at full-width-half-maximum below 5 nanometers (FWHM<5 nm). For example, the coherent light may be generated with a diode laser, which typically operates around FWHM=0.3-1.0 nm. Coherent light, unlike incoherent light in traditional displays (e.g. LEDs), can be manipulated with diffractive optical elements (DOEs) more effectively, that is, with higher freedom and precision. A laser beam array is generated on chip and each beam-pixel is modulated by an amplitude light modulator, such as a liquid crystal element, before being diffracted at a DOE to produce an output angular distribution (or "cone of emission") containing several rays at angles θi.

Figure 12:
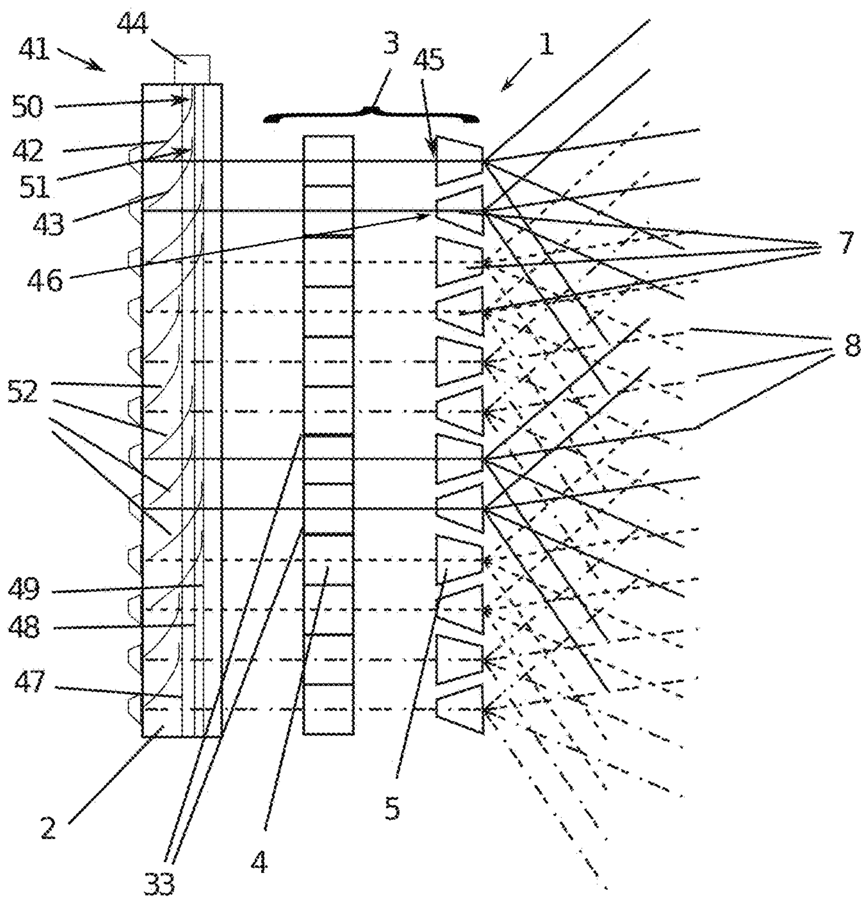
FIG. 12 schematically illustrates a fifth embodiment of a display device, which, compared to the first embodiment, uses a backlight supporting improved coherence.

Another embodiment of a display device 1 according to the present disclosure is shown in FIG. 12. In this embodiment, the backlight 2 comprises an optical device 41 having at least a first waveguide 42 and at least a second waveguide 43 for guiding a light beam emitted from a light source 44. The light beams guided by different waveguides 42, 43 arrive at different areas 45, 46 of the masking layer 5. The light beam arriving at the masking layer 5 from each waveguide 42, 43 is coherent. The optical device 41 comprises multiple bus waveguides 47, 48, 49 for guiding the light beam emitted from the light source 44 and at least a first and a second optical coupler 50, 51, in particular directional couplers, wherein the first optical coupler 50 couples light emitted from the light source 44 from a first bus waveguide 48 to the first waveguide 42 and the second optical coupler 51 couples the light beam emitted from the light source 44 from the same first bus waveguide 48 to the second waveguide 43. Other waveguides 52 are coupled in a similar manner to every one of the bus waveguides 47-49.

One further embodiment within the scope of the present disclosure is to use the display device 1 with a backlight 2 that provides directional multiplexing of the optical elements 7 of the masking layer 5. More specifically, two or more different sets of waveguide circuits may be used to direct light to the display layer 4 and masking layer 5, wherein those sets differ in the direction of the provided rays. This can be used to provide two or more different output angular distributions 8 with each type of optical elements 7. If the difference (e.g. angular offset) achieved by switching the backlight circuit is coordinated with the differences (e.g. angular offsets) between the types of optical elements, each type can effectively be multiplexed with the number of backlight circuits. This can be used to reduce the number of necessary pixel types and hence increase spatial resolution but requires a fast LCD for time sequential image delivery as—in general—each sequential image may combine configurations from all backlight circuits, which therefore have to be cycled through for each frame.

Figure 13:
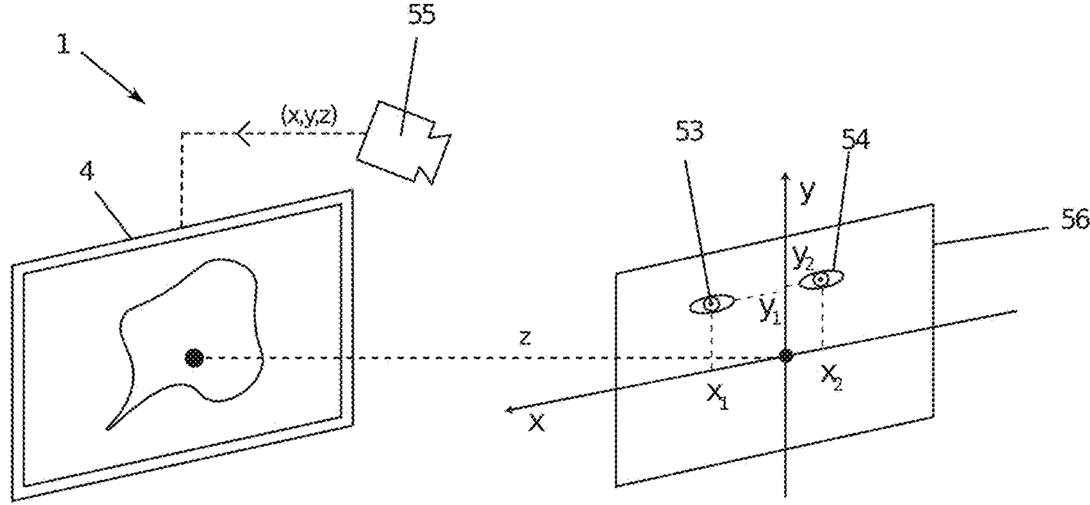
FIG. 13 schematically illustrates an extended embodiment of a display device according to any of the other embodiments and in addition having a viewer tracking system.

To control which images are presented to a viewer, the display device 1 adjusts the configuration of the display layer 4 to match the position (x, y) of the eyes 53, 54 of the viewer as illustrated in FIG. 13. To initialize this setting and to update this adjustment when the viewer moves, the display device 1 may comprise a viewer tracking system 55. The viewer tracking system 55 provides for a fast and accurate readout of eyes position (x, y, z). Specifically, it may monitor the position of each eye 53, 54 in a plane 56 parallel to the display layer 4 with an accuracy smaller than a view zone width (e.g. 30×30 mm) and operate at around 50 Hz. These requirements are well within the performance of current commercial off-the-shelf components. If each type of optical elements 7 suppresses transmission to all directions within at least one range 25 of azimuthal angles defined in a reference plane 13 normal to the masking layer 5, i.e. the suppression forms vertical slices, the viewer tracking system 55 may optionally track only the horizontal position (x) and the distance (z) of the viewer. In this situation, the viewer tracking system 55 may optionally create vertical parallax by tracking the vertical position (y) of the viewer and adjusting the image correspondingly.

The invention claimed is:

1. A display device comprising:

a backlight configured to provide coherent light and comprises a light source, and a stack of layers traversed by light emitted from the backlight, wherein the stack of layers comprises:

a masking layer comprising an array of optical elements, wherein at least some of the optical elements are diffractive optical elements, and a display layer comprising an array of amplitude light modulators, wherein the array of optical elements comprises at least two types of optical elements, wherein the types differ in their output angular distribution, wherein the backlight comprises an optical device having a first waveguide and a second waveguide for guiding light beams emitted from the light source, wherein light beams guided by different waveguides arrive at different areas of the masking layer, wherein each of the light beams arriving at the masking layer from each waveguide is coherent, wherein the optical device further comprises a bus waveguide, a first optical coupler, and a second optical coupler, wherein the first optical coupler is configured to couple the light beams emitted from the light source from the bus waveguide to the first waveguide, and the second optical coupler is configured to couple the light beams emitted from the light source from the bus waveguide to the second waveguide.

2. The display device according to claim 1, wherein the display layer is arranged between the backlight and the masking layer.

3. The display device according to claim 1, wherein each type of optical elements suppresses at least one range of directions of transmission.

4. The display device according to claim 3, wherein each type of optical elements suppresses transmission to all directions within at least one range of azimuthal angles defined in a reference plane normal to the masking layer.

5. The display device according to claim 4, wherein each type of optical elements suppresses transmission to all directions within multiple ranges of azimuthal angles.

6. The display device according to claim 5, wherein the multiple ranges are equal in size and distance from each other.

7. The display device according to claim 6 wherein the at least two types of optical elements differ in an azimuthal offset of their respective multiple ranges.

8. The display device according to claim 1, wherein the optical elements are arranged in groups, wherein each group comprises exactly one optical element of each type.

9. The display device according to claim 8, wherein each group consists of two or more rows and two or more columns of optical elements in each row.

10. The display device according to claim 1, wherein the masking layer comprises two overlapping arrays of optical elements, wherein the optical elements in a first array are responsible for shaping a transmitted beam in a first plane normal to the masking layer and the optical elements in a second array are responsible for shaping a transmitted beam in a second plane normal to the first plane and to the masking layer.

11. The display device according to claim 10, wherein the optical elements of the first array are diffractive optical elements and the optical elements of the second array are refractive optical elements.

12. The display device according to claim 1, wherein at least for a part of the display area the number of optical elements within that part of the display area is more than half the number of amplitude light modulators within that part of the display area.

* * * * *